Nov. 4, 1941.  E. L. GOODEN  2,261,802
APPARATUS FOR MEASURING THE COARSENESS OF POWDERS
Filed May 28, 1941

ERNEST L. GOODEN  Inventor

By

Attorney

Patented Nov. 4, 1941

2,261,802

UNITED STATES PATENT OFFICE 2,261,802

APPARATUS FOR MEASURING THE COARSENESS OF POWDERS

Ernest L. Gooden, Washington, D. C., assignor to Claude R. Wickard, as Secretary of Agriculture of the United States of America, and to his successors in office Application May 28, 1941, Serial No. 395,600

3 Claims. (Cl. 73—151)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to me of any royalty thereon.

The object of my invention is to provide a device for measuring the coarseness of powders.

An object of my invention is to accomplish the final result of such determinations automatically, without calculation and with a minimum expenditure of time and effort.

Another object of my invention is to determine in a highly automatic manner the specific surface of powders.

Another object of my invention is to determine in a highly automatic manner the average fineness of powders as expressed in terms analogous to mesh sizes of testing screens.

The three purposes named above are accomplished in a similar manner, the difference in procedure being only in the plotting of the scale by which the results are read.

Since a powder commonly is composed of particles covering a considerable range of sizes and shapes, it is often a tedious task to determine an average and representative diametral value by which the powder suitably may be characterized. A recognized measure of the coarseness of a powder is the surface mean diameter of its component particles, and this diameter is a function of the specific surface of the powder as expressed in amount of surface per unit volume.

The permeability of a bed of powder to a fluid is known to be a function of (1) the porosity of the bed, as expressed, for example, in percentage of voids, and (2) the specific surface of the powder from which the bed is formed. To determine the surface mean diameter, hereinafter called the average particle diameter, of a powder, it is possible to measure separately, by suitable means, the porosity and the permeability of the sample, and from the relationships mentioned above and through the use of technically known constants, to calculate the average particle diameter of the powder.

Figure 1:
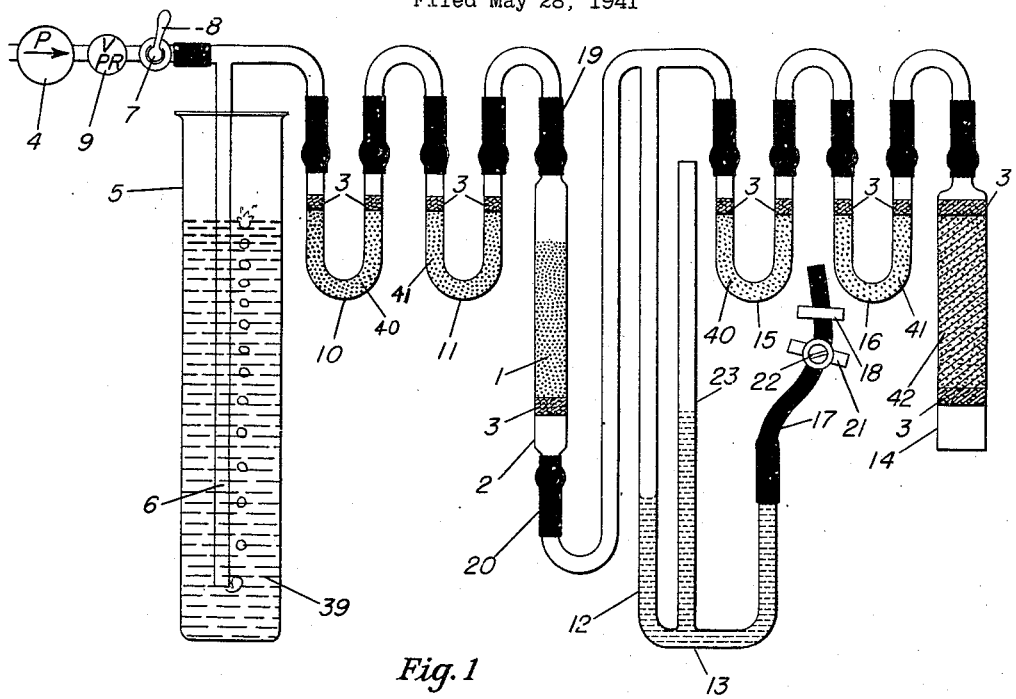
Figure 2:
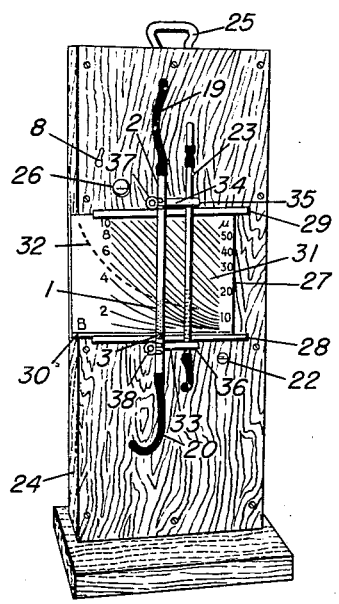

In the accompanying drawing, Figure 1 is a diagrammatic representation of the system of working parts, exclusive of the gage scale, and Figure 2 is a front elevation of the complete apparatus.

Similar numerals refer to similar parts throughout the views.

The compacted sample 1 of powder, on which a determination is to be made, is placed in a transparent sample tube 2, wherein it is supported by a porous support 3, such as a wad of fibrous material. Air is forced through sample 1 by pump 4, which is preferably of a type having an electric motor built in as an integral part. The pressure of the air at the point of entering the sample is maintained constant by a standpipe regulator 5 filled with a liquid 39, such as water, up to a given level. The excess air above that required to maintain the desired pressure is liberated in bubbles from the vent tube 6. An air flow control 7, having a handle 8, constitutes a means for preventing violent bubbling in standpipe 5, and the apparatus is further protected by safety valve 9, such as a slit in a rubber tube forming part of the air line (Bunsen valve).

After leaving regulator 5, and before entering sample 1, the air passes through drying tubes 10, 11, the former tube 10, preferably being loaded with an inexpensive drying agent 40, such as calcium chloride, and the latter tube 11, preferably being loaded with a very efficient drying agent 41, such as granular anhydrous magnesium perchlorate. After flowing through sample 1, the air passes over back-arm 12 of hydrostatic manometer 13, thence out through resistor 14, of known resistance, into the atmosphere.

Resistor 14 is preferably composed of a transparent tube packed with a powder, such as fine sand 42. If, as I consider preferable, the liquid used in the manometer is water, it is best to have inserted in the air line, between back-arm 12 and resistor 14, additional drying tubes 15, 16, containing agents 40 and 41, respectively. The combined resistance of porous support 3, and drying agents 40 and 41 in tubes 10, 11, 15, 16, must be negligibly small in comparison with the resistance of sample 1.

Manometer 13 is provided with a flexible leveling tube 17, adapted to be closed by a suitable clamp 18, such as a pinchcock. Leveling tube 17, connections 19 and 20 to the sample tube 2, and various other passages and connections in the system may be made preferably of flexible rubber tubing. Attached to leveling tube 17 below clamp 18 is a screw clamp 21, operated preferably by a slotted screw head 22, through the use of a screwdriver, for fine adjustment of manometer 13. Only front-arm 23 (which is the rising arm) of manometer 13 is used in making readings; back-arm 12, along with all the other parts that do not require frequent access, appropriately may be mounted out of sight within a housing 24, which should be left open on its back side, and which should be provided with a handle 25 at the top for carrying. Window 26 facilitates inspection of the rate of bubbling in pressure regulator 5.

Reading of manometer 13 is done with reference to a movable scale 27, adjustable by lateral shifting along suitable tracks, such as grooves 28, 29. The purpose of the adjustability of scale 27 is hereinafter set forth.

It is a recognized principle that in compacted beds of fine granular materials, such as ordinary powders, the surface mean diameter of the component granular material is related to the porosity of the bed and the permeability of the bed to fluids as indicated by equation $$D = \frac{3}{5000}\sqrt{\frac{kpK(1-e)^2}{ge^3}}$$

where $D$ = the surface mean diameter expressed as the diameter in microns of a sphere having the same volume-to-surface ratio as the combined group of particles constituting the sample; $g$ = the gravitational constant in centimeters per second per second; $e$ = the porosity expressed as ratio of volume of voids to total volume of bed; $k$ = a proportionality constant (which has an experimentally determined value of 5.0); $p$ = the viscosity of the fluid in poises; and, $K$ = permeability expressed as apparent linear velocity (in centimeters per second) per unit pressure gradient (in grams per square centimeter per centimeter). By apparent linear velocity is meant the volume rate of delivery of fluid from the sample divided by the internal cross section area of the tube in which the sample is assumed to be packed. If the fluid is a gas, the volume of a given mass is variable through the apparatus because of changes in pressure, but in the apparatus here described the pressure of the gas departs so little from atmospheric pressure as to require never more than a simple and almost insignificant adjustment in the calculation.

In the application of the foregoing principle to the herein described invention, it is obvious that if all parts of the apparatus and conditions of observation, including the porosity of the compacted sample and the total volume of its component particles, were sufficiently standardized, it would be possible to calibrate, by calculation from the above equation, a fixed scale for front manometer arm 23, whereby the reading would be given directly in units of surface mean diameter. In practice, I have found it convenient to standardize sufficiently all the parts and conditions, except the porosity. In work with a wide variety of materials it is not feasible to attempt to produce the same degree of compactness in all samples. The scale that I have therefore devised consists, in mathematical principle, of the combination of a number of fixed scales, calculated, in the manner described above, for the various degrees of compactness, and placed side by side on a common horizontal base line 30, the base line itself constituting an axis for representing degrees of compactness, measured in proportion to some convenient function of porosity. In actuality, the numerous vertical scales are not drawn as separate entities; but instead, for any desired value of surface mean diameter the several calculated points are connected by a smooth curve, labeled with the appropriate diametral value, and in like manner each group of corresponding calculated points is used to form its respective isodiametral curve. A set of such curves is shown at 31 in Figure 2.

With reference to base line 30, as an axis of degrees of compactness, there is plotted also a graph 32 of the variation of height of sample column with variation in porosity. This graph 32, called the sample curve, is drawn so that the vertical scale is actual size, and is transposed laterally through a distance equal to the center-to-center separation of sample tube 2 from front manometer arm 23; this separation being fixed, as for sample by spacing blocks 33, 34 used in conjunction with permanent clamps 35, 36 for said manometer arm and with friction clips 37, 38 for the sample tube.

The preferred operation of my apparatus is as follows. The requirement as to size of sample is a definite total volume of particles, and this volume is assured by the taking of a weight in proportion to the density of the material of the particles. For example, if the design and standardization of the apparatus calls for a sample with a volume of one cubic centimeter, then the required volume of sample is obtained by weighing out a number of grams equal to the average density, in grams per cubic centimeter, of the material of which the particles are composed. Sample 1 is weighed out, loaded into sample tube 2, and compacted in place in such manner as may be suited to the case. Tube 2, containing sample 1 is inserted in the air line by connections 19, 20, and is then placed in position behind clips 37, 38, with the bottom of the sample adjusted to the level of base line 30 of movable scale 27. Scale 27 is then shifted laterally to such a position that sample curve 32 marks the top of the sample, air pump 4 is started and control 7 adjusted by means of handle 8 to produce gentle bubbling; the liquid rises in arm 23 and comes to rest in such a position with relation to curves 31 as to indicate directly the average particle diameter of the sample.

When desired, curves 31 may be designed and labeled to indicate certain functions of particle size other than the surface mean diameter. For example, each of the curves 31 originally described as representing mean diameter may be labeled to show the corresponding value for specific surface. In another example, the diametral values for plotting the curves 31 may be so chosen, and the curves so labeled, as to provide a suitable scale of readings in terms of average fineness, such as a scale of average theoretical screen-mesh sizes. With any of these variations in scale design, the operation of my apparatus is the same as above described.

I am aware that prior to my invention apparatuses have been made for indicating functions of particle size as deduced from permeability of powder beds to gases; therefore I do not claim such an apparatus broadly, the principal idea of my invention being the self-calculating feature. Also, I desire to have it understood that while I have described the principles of the operation of my invention, together with the apparatus which I now consider to represent the best embodiment thereof, the apparatus shown is only illustrative and the invention can be carried out by other means without departing from the spirit of the invention or exceeding the scope of the appended claims.

Having thus described my invention, what I claim for Letters Patent is:

1. In an air-permeation apparatus adapted for testing powders, a combination of a transparent sample-tube adapted for containing a powder sample; a porous support for the sample within said tube; a pump adapted for forcing air through the sample; a hydrostatic regulator adapted for fixing the pressure of the air entering the sample; drying tubes adapted for drying the air before it enters the sample; a resistor adapted to permit the passage of air on its way from the sample into the surrounding atmosphere; a hydrostatic manometer having a front arm open to the surrounding atmosphere and the other arm connected to an air line between said resistor and the sample-tube; and, a laterally sliding scale slidably mounted behind the sample-tube and the front arm of the manometer and graduated by curved lines representing units of surface mean particle diameter and having a guide line adapted to correlate the height of the sample with the zone of the sliding scale applicable with the existing degree of compactness of the sample.

2. In an air-permeation apparatus adapted for testing powders, a combination of a transparent sample-tube adapted for containing a powder sample; a porous support for the sample within said tube; a pump adapted for forcing air through the sample; a hydrostatic regulator adapted for fixing the pressure of the air entering the sample; drying tubes adapted for drying the air before it enters the sample; a resistor adapted to permit the passage of air on its way from the sample into the surrounding atmosphere; a hydrostatic manometer having a front arm open to the surrounding atmosphere and the other arm connected to an air line between said resistor and the sample-tube; and, a laterally sliding scale slidably mounted behind the sample-tube and the front arm of the manometer and graduated by curved lines representing appropriate units of specific surface and having a guide line adapted to correlate the height of the sample with the zone of the sliding scale applicable with the existing degree of compactness of the sample.

3. In an air-permeation apparatus adapted for testing powders, a combination of a transparent sample-tube adapted for containing a powder sample; a porous support for the sample within said tube; a pump adapted for forcing air through the sample; a hydrostatic regulator adapted for fixing the pressure of the air entering the sample; drying tubes adapted for drying the air before it enters the sample; a resistor adapted to permit the passage of air on its way from the sample into the surrounding atmosphere; a hydrostatic manometer having a front arm open to the surrounding atmosphere and the other arm connected to an air line between said resistor and the sample-tube; and, a laterally sliding scale slidably mounted behind the sample-tube and the front arm of the manometer and graduated by curved lines representing appropriate units of particle fineness and having a guide line adapted to correlate the height of the sample with the zone of the sliding scale applicable with the existing degree of compactness of the sample.

ERNEST L. GOODEN.